US012504837B2

(12) United States Patent
Shao et al.

(10) Patent No.: US 12,504,837 B2
(45) Date of Patent: Dec. 23, 2025

(54) TOUCH DEVICE AND INPUT DEVICE

(71) Applicant: Lite-On Technology Corporation, Taipei (TW)

(72) Inventors: Min Chuan Shao, Taipei (TW); Chun-Chieh Huang, Taipei (TW); Ming-Fu Yen, Taipei (TW)

(73) Assignee: Lite-On Corporation, Taipei (TW)

( * ) Notice: Subject to any disclaimer, the term of this patent is extended or adjusted under 35 U.S.C. 154(b) by 0 days.

(21) Appl. No.: 18/957,900

(22) Filed: Nov. 25, 2024

(65) Prior Publication Data

US 2025/0173007 A1     May 29, 2025

Related U.S. Application Data

(60) Provisional application No. 63/573,484, filed on Apr. 3, 2024, provisional application No. 63/603,096, filed on Nov. 27, 2023.

(51) Int. Cl.
    *G06F 3/041*     (2006.01)
    *G06F 3/0354*     (2013.01)

(52) U.S. Cl.
    CPC .............................. *G06F 3/03547* (2013.01)

(58) Field of Classification Search
CPC .... G06F 1/169; G06F 3/0354; G06F 3/03547; G06F 3/041; G06F 3/0414; G06F 3/04146; G06F 2203/04105; G06F 2203/04108
See application file for complete search history.

(56) References Cited

U.S. PATENT DOCUMENTS

| | | | | |
|---|---|---|---|---|
| 11,049,672 B2* | 6/2021 | Lu | ............................ | G06F 1/169 |
| 11,340,719 B1* | 5/2022 | Lin | ...................... | G06F 3/03547 |
| 12,242,677 B1* | 3/2025 | Chen | .................... | G06F 3/03547 |
| 12,321,541 B2* | 6/2025 | Chen | .................... | G06F 3/03547 |
| 12,393,290 B1* | 8/2025 | Chen | .................... | G06F 3/03547 |
| 2012/0103773 A1* | 5/2012 | Villain | ................. | G06F 3/03547 |
| | | | | 200/344 |
| 2013/0228427 A1* | 9/2013 | Sano | ..................... | H01H 25/041 |
| | | | | 200/295 |
| 2015/0243457 A1* | 8/2015 | Niu | ......................... | H01H 13/46 |
| | | | | 156/247 |
| 2019/0243475 A1* | 8/2019 | Huang | ................... | G06F 1/1681 |
| 2019/0243476 A1* | 8/2019 | Chen | ....................... | H01H 3/122 |
| 2019/0391656 A1* | 12/2019 | Togawa | .................. | G06F 3/042 |
| 2020/0333917 A1* | 10/2020 | Lu | ............................ | H01H 13/83 |

(Continued)

*Primary Examiner* — Joe H Cheng
(74) *Attorney, Agent, or Firm* — JCIPRNET

(57) ABSTRACT

A touch device is provided in the disclosure. The touch device includes a panel, a circuit board, a bracket, and a reinforcement structure. The circuit board has a first surface and a second surface opposite to each other. The panel is disposed on the first surface of the circuit board. The bracket is disposed on the second surface of the circuit board. The reinforcement structure includes a fixing end portion and a moving end portion opposite to each other and a stopper. The fixing end portion is connected to the bracket, and the stopper is adjacent to the moving end portion and is distant from the fixing end portion. The stopper is adapted to move in a first direction. The touch device has a simple structure requiring fewer components to support inputs at multiple locations, to provide excellent touch experience. An input device including the touch device is also provided.

20 Claims, 10 Drawing Sheets

(56) References Cited

U.S. PATENT DOCUMENTS

| | | | |
|---|---|---|---|
| 2021/0263556 A1* | 8/2021 | Degner | G06F 3/04883 |
| 2022/0066580 A1* | 3/2022 | Lin | G06F 3/03547 |
| 2023/0307196 A1* | 9/2023 | Liao | H01H 3/125 |

* cited by examiner

TOUCH DEVICE AND INPUT DEVICE

CROSS-REFERENCE TO RELATED APPLICATION

This application claims the priority benefit of U.S. provisional application Ser. No. 63/603,096, filed on Nov. 27, 2023, and U.S. provisional application Ser. No. 63/573,484, filed on Apr. 3, 2024. The entirety of each of the above-mentioned patent applications is hereby incorporated by reference herein and made a part of this specification.

BACKGROUND

Technical Field

The disclosure relates to a touch device, and in particular to a touch device applied in an input device.

Description of Related Art

A touchpad in an electronic product such as a laptop computer typically has a complex structure that includes many components and requires intricate assembly processes, which drives up manufacturing costs. Therefore, there is a need for a touchpad that is structurally simple and easy to assemble, and supports inputs at multiple locations, to provide excellent touch experience.

SUMMARY

The disclosure is directed to a touch device with simple structures and lower manufacturing costs, which supports inputs at multiple locations, to provide excellent touch experience.

The disclosure is also directed to an input device including the touch device.

According to an embodiment of the disclosure, a touch device includes a panel, a circuit board, a bracket, and a reinforcement structure. The circuit board has a first surface and a second surface opposite to each other. The panel is disposed on the first side of the circuit board. The bracket is disposed on the second side of the circuit board. The reinforcement structure includes a fixing end portion and a moving end portion opposite to each other and a stopper. The fixing end portion is connected to the bracket, and the stopper is adjacent to the moving end portion and is distant from the fixing end portion. The stopper is adapted to move in a first direction.

In the touch device according to an embodiment of the disclosure, the stopper protrudes from the moving end portion in a second direction, and the second direction is orthogonal to the first direction.

In the touch device according to an embodiment of the disclosure, the bracket has an opening penetrating through the bracket. The reinforcement structure is disposed in the opening, and the fixing end portion is connected to a first inner lateral wall of the opening.

In the touch device according to an embodiment of the disclosure, the bracket further includes a notch, and the notch is formed on a second inner lateral wall of the opening and is adapted to accommodate the stopper.

In the touch device according to an embodiment of the disclosure, a gap is formed between the reinforcement structure and the second inner lateral wall of the opening.

In the touch device according to an embodiment of the disclosure, a slit is provided between the first inner lateral wall and the second inner lateral wall.

In the touch device according to an embodiment of the disclosure, the reinforcement structure and the bracket are formed into one piece.

In the touch device according to an embodiment of the disclosure, one end of the bracket corresponding to the fixing end portion has a bending section, and the bending section is provided with a hole.

In the touch device according to an embodiment of the disclosure, the touch device further includes a switch. The switch is disposed on the second surface of the circuit board and is adjacent to the moving end portion. The bracket includes a protruding portion, and the protruding portion is aligned with the switch.

In the touch device according to an embodiment of the disclosure, the reinforcement structure includes a first reinforcement member and a second reinforcement member. The first reinforcement member is disposed on the second surface of the circuit board, and a side portion of the first reinforcement member includes the stopper. A surface of the first reinforcement member adjacent to the circuit board includes a groove. The second reinforcement member includes the fixing end portion and the moving end portion. The fixing end portion is connected to the bracket, and the moving end portion is adapted to be slidably disposed in the groove of the first reinforcement member.

In the touch device according to an embodiment of the disclosure, the moving end portion and the fixing end portion are connected through a plurality of elastic arms, and the plurality of elastic arms are disposed at intervals on an outer peripheral surface of the fixing end portion and extend toward the first reinforcement member.

In the touch device according to an embodiment of the disclosure, a width of the moving end portion is greater than a width of a side opening of the groove.

In the touch device according to an embodiment of the disclosure, each of the plurality of elastic arms has a bending region.

In the touch device according to an embodiment of the disclosure, the touch device further includes a switch. The switch is disposed between the circuit board and the bracket. The second reinforcement member or the bracket further includes a protruding portion, and the protruding portion is aligned with the switch.

In the touch device according to an embodiment of the disclosure, the touch device further includes an elastic body, the elastic body is positioned between the switch and the protruding portion.

In the touch device according to an embodiment of the disclosure, the touch device further includes a cover body. The cover body surrounds the panel, the cover body is provided with a stopping surface adjacent to the panel, and the stopping surface is adapted to restrict movement of the stopper in the first direction.

In the touch device according to an embodiment of the disclosure, the stopper has an engaging portion. The engaging portion contacts a surface of the bracket distant from the circuit board and is adapted to restrict movement of the reinforcement structure in a first direction.

In the touch device according to an embodiment of the disclosure, a notch is provided on an edge of the bracket, and the engaging portion passes through the notch.

In the touch device according to an embodiment of the disclosure, the stopper is disposed on two opposite sides of the reinforcement structure.

In summary, in the touch device of the disclosure, the reinforcement structure includes the fixing end portion and the moving end portion opposite to each other and the stopper. The fixing end portion is connected to a bracket, and the moving end portion is movable relative to the fixing end portion. By implementing the reinforcement structure in the design, multiple locations of the touch device are accessible to receive touch inputs without introducing additional components. The device is structurally simplified and easy to assemble, thereby lowering manufacturing costs while ensuring excellent touch experience.

To make the aforementioned features and advantages of the disclosure more comprehensible, the following specific embodiments are described in detail with reference to the accompanying drawings.

DESCRIPTION OF THE EMBODIMENTS

Figure 1:
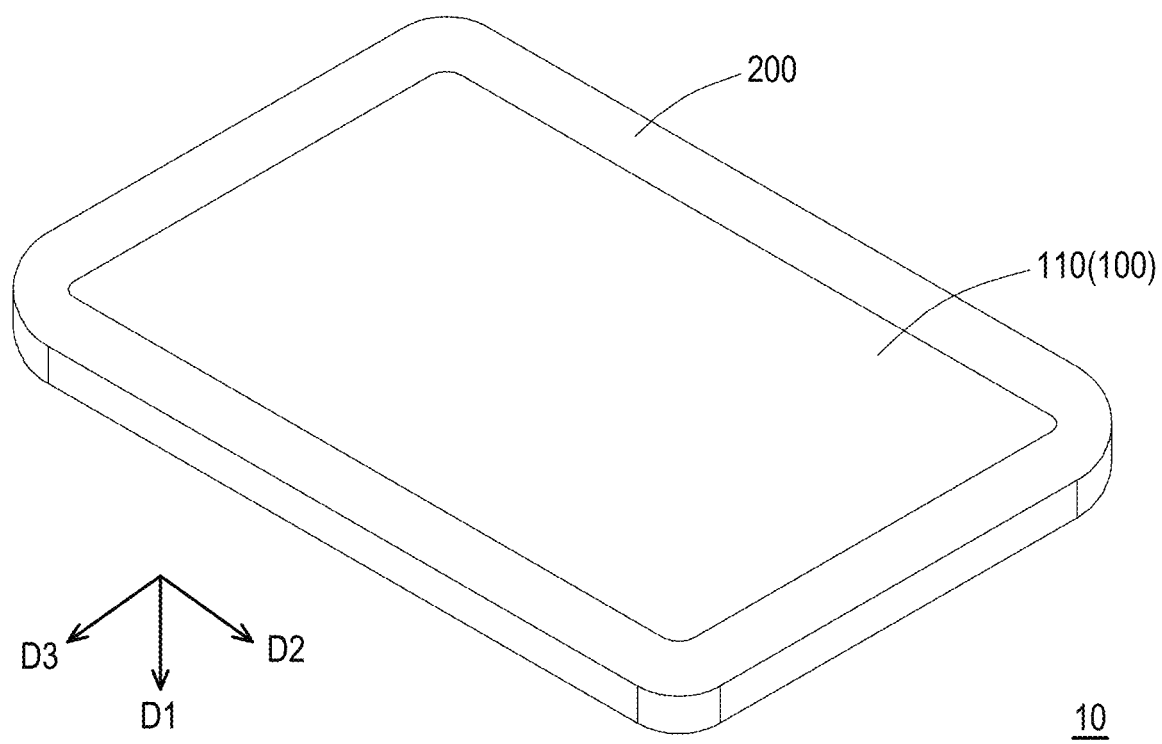
FIG. 1 is a schematic view of an input device according to an embodiment of the disclosure.

FIG. 1 is a schematic view of an input device according to an embodiment of the disclosure. Referring to FIG. 1, the input device 10 in this embodiment is, for example, a touchpad, which may be applied to an electronic device such as a laptop computer, but the type of the electronic device is not limited thereto. The input device 10 includes a touch device 100 and a cover body 200, allowing users to input commands by touching and pressing to operate the electronic device. The touch device 100 has a simple structural design and is incorporated to the electronic device through the cover body 200. This design will be further explained below.

Figure 2:
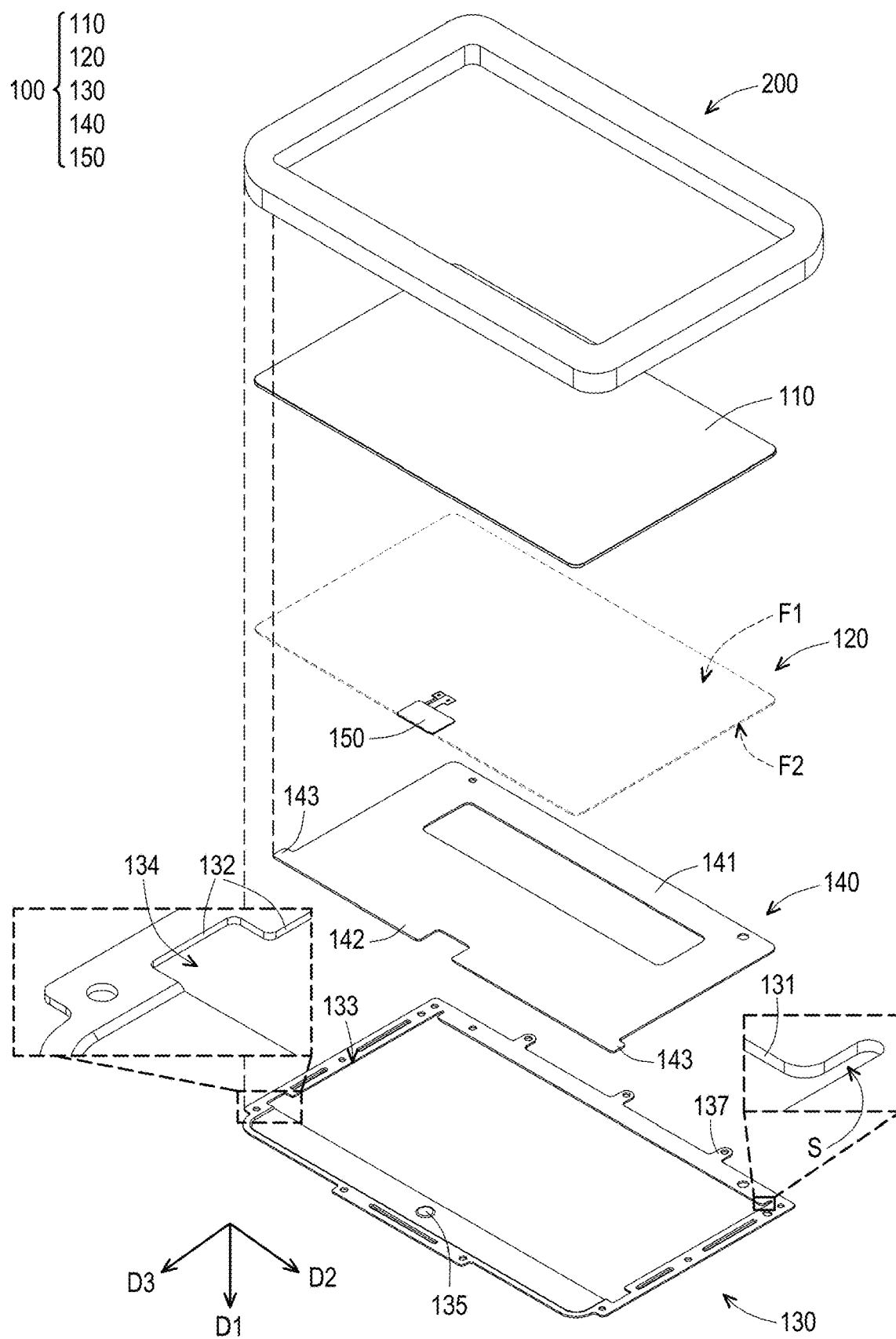
FIG. 2 is an exploded schematic view of the touch device of FIG. 1.

FIG. 2 is an exploded schematic view of the touch device of FIG. 1. The circuit board 120 in FIG. 2 is drawn with dotted lines to reveal the position of the switch 150. Referring to FIG. 2, the touch device 100 in this embodiment includes a panel 110, a circuit board 120, a bracket 130, and a reinforcement structure 140. The panel 110 is made of glass, for example, and may allow users to input commands by touching or pressing. The circuit board 120 has a first surface F1 and a second surface F2 opposite to each other. The panel 110 is disposed on the first surface F1 of the circuit board 120, and the bracket 130 is disposed on the second surface F2 of the circuit board 120. The reinforcement structure 140 is disposed on the second surface F2 of the circuit board 120 and is positioned between the circuit board 120 and the bracket 130. The bracket 130 and the reinforcement structure 140 are, for example, metal parts. The panel 110, the circuit board 120, and the reinforcement structure 140 are connected to each other by gluing, for example, but their connection is not limited thereto.

Further, the bracket 130 includes a fixing area 137 and an opening 133 penetrating through the bracket 130. The fixing area 137 of the bracket 130 includes a locking hole, which may be fixed to the cover body 200 of the electronic device, such as a keyboard cover or a bottom plate (not shown) of a laptop computer, by a locking member such as a screw (not shown), so as to fix the input device 10 to the electronic device, but the fixation method for the fixing area 137 is not limited thereto.

The reinforcement structure 140 is disposed in the opening 133, and includes a fixing end portion 141 and a moving end portion 142 opposite to each other. The fixing end portion 141 is connected to a first inner lateral wall 131 of the opening 133. In this embodiment, such connection is realized by spot welding, for example, to improve the flatness and reduce regional stress at the connection, but the connection method is not limited thereto. The moving end portion 142 is suspended in the opening 133. Since the reinforcement structure 140 is flexible, the moving end portion 142 is movable with respect to the fixing end portion 141 in a first direction D1.

In this embodiment, the touch device 100 further includes a switch 150. The switch 150 is, for example, a metal dome, and may be disposed on the second surface F2 of the circuit board 120 and adjacent to the moving end portion 142 of the reinforcement structure 140.

The bracket 130 or the moving end portion 142 may further include a protruding portion 135, and the protruding portion 135 is aligned with the switch 150.

Note that the cover body 200 shown in FIG. 1 and FIG. 2 is only a schematic illustration.

The size, shape and structure of the cover body 200 are not limited thereto.

Figure 3:
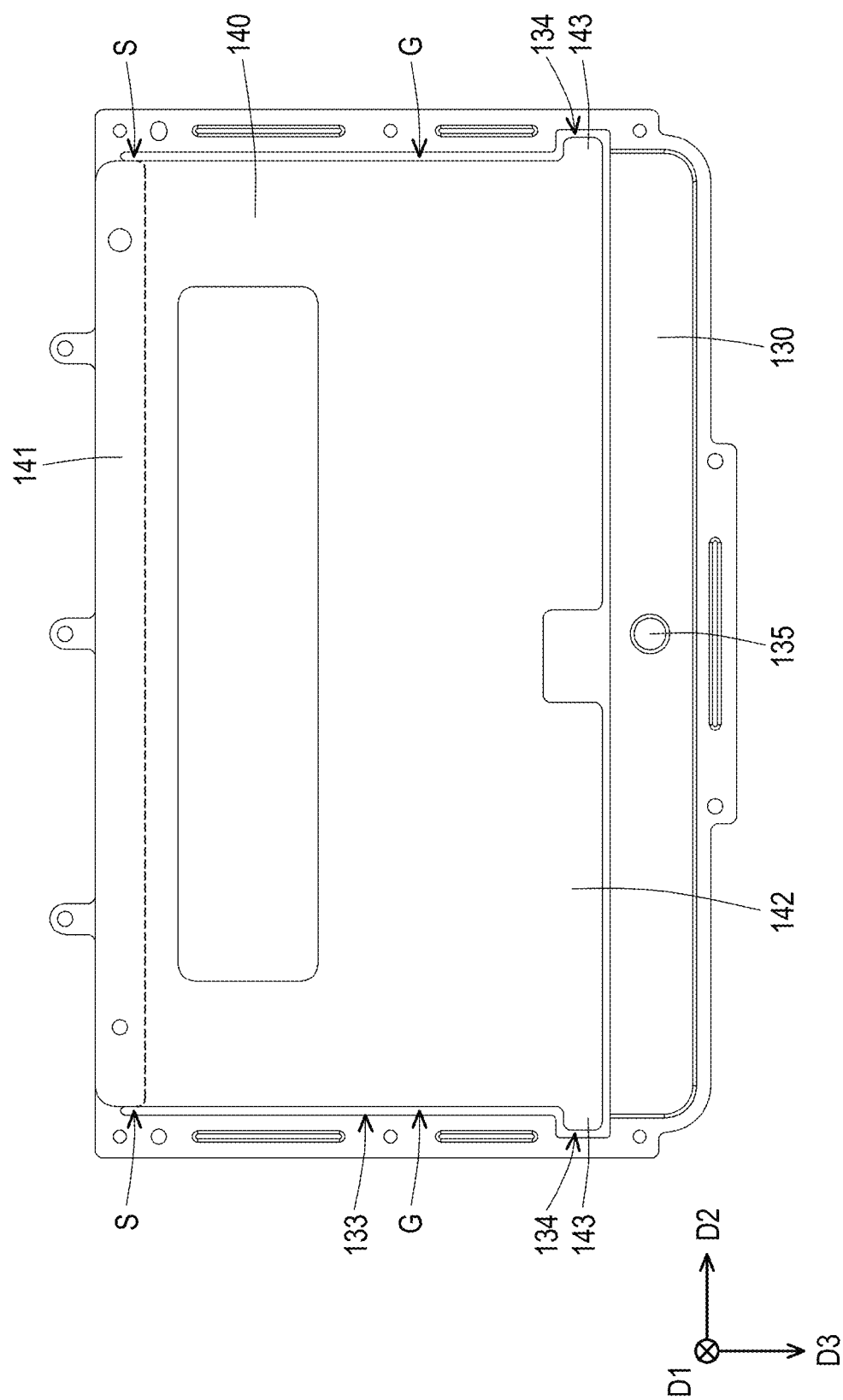
FIG. 3 is a front view of the touch device of FIG. 1, illustrating a reinforcement structure combined to a bracket.

FIG. 3 is a front view of the touch device of FIG. 1, illustrating a reinforcement structure combined to a bracket. To visualize the entire structure of the bracket 130, the portion of the bracket 130 shielded by the reinforcement structure 140 is drawn with a dotted line in FIG. 3. Referring to FIG. 3, the reinforcement structure 140 in this embodiment further includes one or more stoppers 143. The stopper 143 is adjacent to the moving end portion 142 and distant from the fixing end portion 141. More specifically, the stopper 143 protrudes from the moving end portion 142 in a second direction D2, wherein the second direction D2 is orthogonal to the first direction D1.

The bracket 130 further includes one or more notches 134. The notch 134 is recessed from a second inner lateral wall 132 of the opening 133 in the second direction D2 and is adapted to accommodate the stopper 143. The second inner lateral wall 132 is approximately orthogonal to the first inner lateral wall 131.

Referring to FIG. 2 and FIG. 3, when the panel 110 is combined to the bracket 130 or the reinforcement structure 140, the stopper 143 extends beyond the edges of the panel 110 in the second direction D2 and is covered by the cover body 200. As such, when the electronic device incorporating the input device 10 is turned upside down, the stopper 143 is restricted by the cover body 200 to prevent the moving end portion 142, the panel 110, and circuit board 120 from falling off or protruding from the electronic device in the first direction D1 due to gravity.

When the user presses at a location of the panel 110, the force is correspondingly exerted to the reinforcement structure 140, so that the moving end portion 142 and the stopper 143 move in the first direction D1 with respect to the fixing end portion 141. Meanwhile, the circuit board 120 moves along with the moving end portion 142, so that the protruding portion 135 on the bracket 130 or the moving end portion 142 triggers the switch 150 on the circuit board 120 that is sinking. Therefore, multiple locations of the touch device are accessible to receive touch inputs.

When pressed, the portion of the reinforcement structure 140 adjacent to the moving end portion 142 experiences a larger displacement in the first direction D1, whereas the portion of the reinforcement structure 140 adjacent to the fixing end portion 141 experiences a smaller displacement in the first direction D1. In other words, if the location where the user applies force on the panel 110 is closer to the moving end portion 142, the input device 10 may be pressed more easily with smaller force.

In this embodiment, the reinforcement structure 140 is connected to one end of the bracket 130 and is disposed in the opening 133 of the bracket 130, so that the reinforcement structure 140 may be pressed to move upward and downward like a cantilever beam. Meanwhile, compared to conventional touchpads requiring additional components such as connecting rods, this design simplifies the device structure, lowers device weight and height, and reduces manufacturing costs and assembly complexity. In addition, the stopper 143 may increase the structural strength of the device and provide better pressing feedback. Therefore, multiple locations of the touch device 100 in this embodiment are accessible to receive touch inputs to provide excellent touch experience.

In addition, in this embodiment, a gap G is formed between the reinforcement structure 140 and the second inner lateral wall 132 of the opening 133 to prevent the bracket 130 from interfering with the reinforcement structure 140 during its movement. A slit S is provided between the first inner lateral wall 131 and the second inner lateral wall 132. The slit S is in communication with the gap G, which may reduce the rigidity of the first inner lateral wall 131 of the bracket 130, thereby improving the mobility of the reinforcement structure 140, making it easier for the moving end portion 142 of the reinforcement structure 140 to move in the first direction D1, thereby reducing the physical effort required for users and mitigating the wear and tear of the first inner lateral wall 131 caused by the movements of the reinforcement structure 140.

Figure 4:
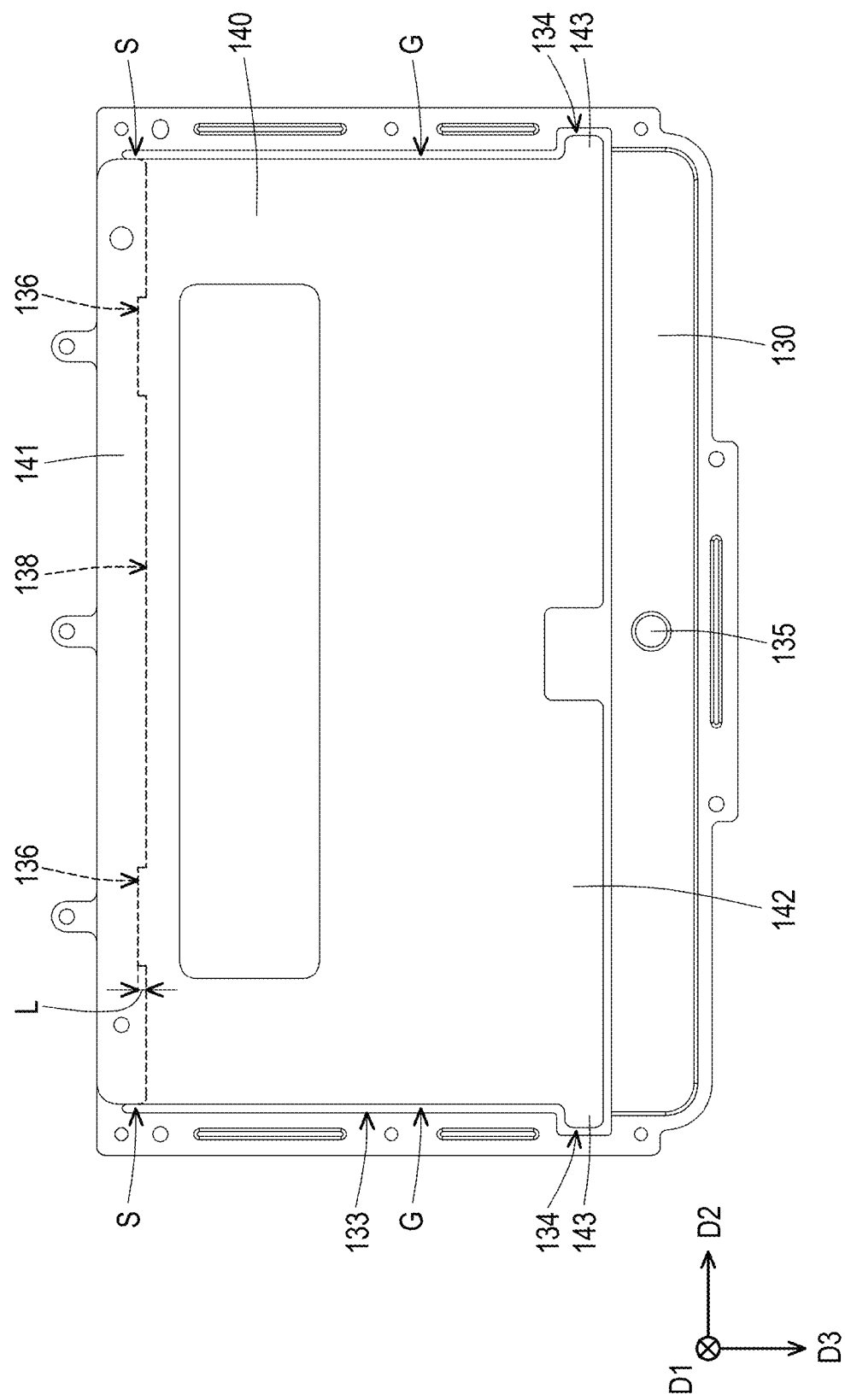
FIG. 4 is a front view of the bracket and the reinforcement structure of the touch device according to another embodiment of the disclosure.

FIG. 4 is a front view of the bracket and the reinforcement structure of the touch device according to another embodiment of the disclosure. To visualize the entire structure of the bracket 130, the portion of the bracket 130 shielded by the reinforcement structure 140 is drawn with a dotted line in FIG. 4.

A main difference between the embodiments shown in FIG. 4 and FIG. 1 is that the bracket 130 in FIG. 4 has a bending section 138 at one end corresponding to the fixing end portion 141. The bending section 138 is adjacent to the opening 133, located between the two slits S, and extends toward the moving end portion 142, so that a height difference is formed between the fixing end portion 141 and the moving end portion 142 of the reinforcement structure 140 in the first direction D1, thereby reducing the overall thickness of the touch device 100. The bending section 138 is provided with a hole 136. The hole 136 may further reduce the rigidity of the reinforcement structure 140 and the bracket 130, enabling the bending section 138 be more deformable, so that the moving end portion 142 of the reinforcement structure 140 may move in the first direction D1 more easily, reducing exertion force required for users. In addition, the hole 136 may reduce the regional stress of the bracket 130 and mitigate the wear and tear of the bracket 130 and the reinforcement structure 140.

In this embodiment, a length L of the hole 136 in a third direction D3 (orthogonal to the second direction D2) may be determined based on design requirements. If the length L is greater, the bending section 138 deforms easier, saving more effort required for users. In addition, two holes 136 are illustrated in this embodiment, but the number of holes 136 is not limited thereto.

In the aforementioned and other embodiments, the reinforcement structure 140 and the bracket 130 may be formed into one piece, eliminating a process for connecting the two components and improving the flatness for the structure.

Figure 5:
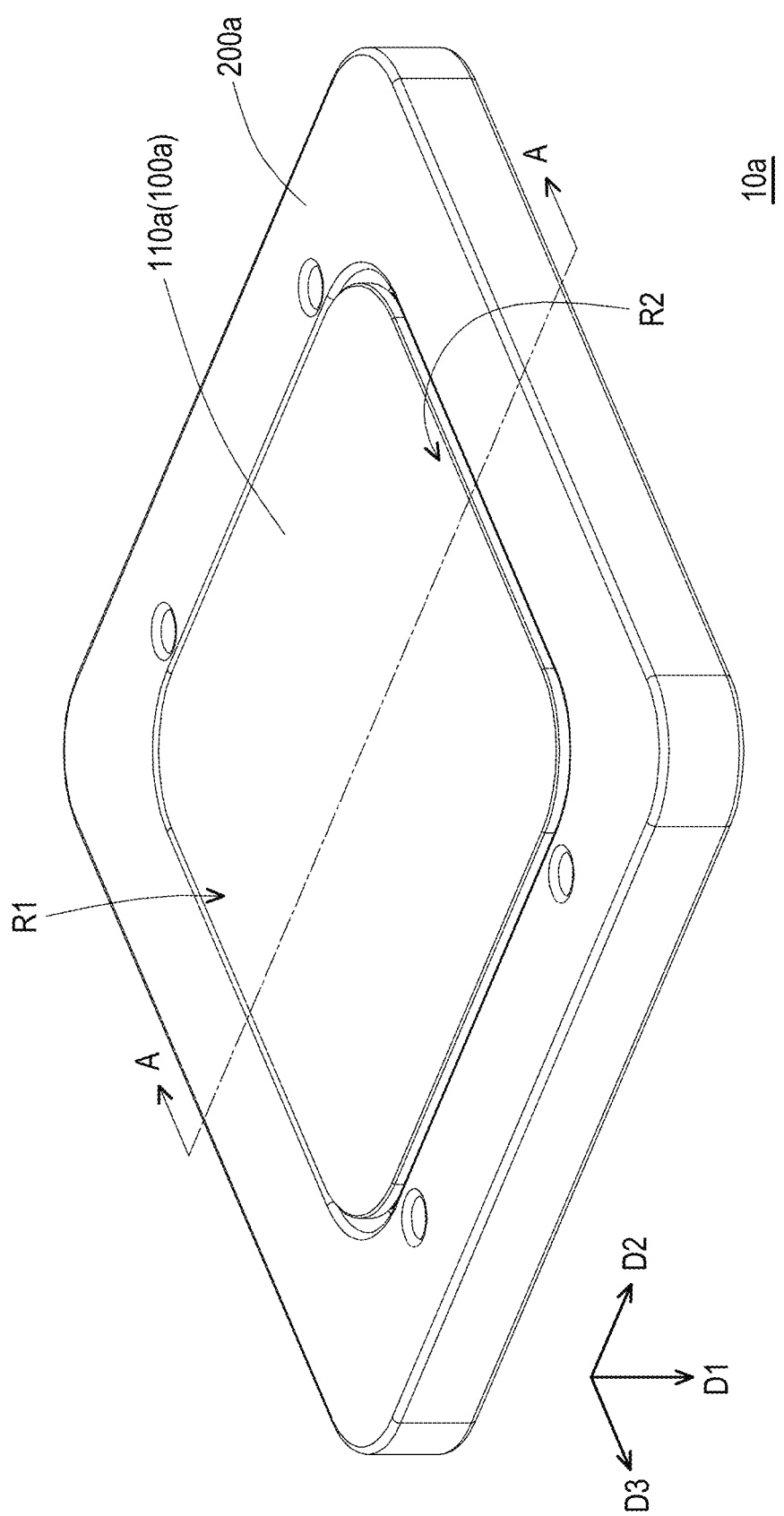
FIG. 5 is a schematic view of the input device according to another embodiment of the disclosure.

An input device 10a according to another embodiment will be illustrated as follows. FIG. 5 is a schematic view of the input device according to another embodiment of the disclosure. Compared with the embodiment shown in FIG. 1, the input device 10a in FIG. 5 may achieve full-region pressing through the touch device 100a. In other words, any location on the panel 110a of the touch device 100a may be pressed in this embodiment, allowing users to input commands conveniently. This design will be further explained below.

Figure 6:
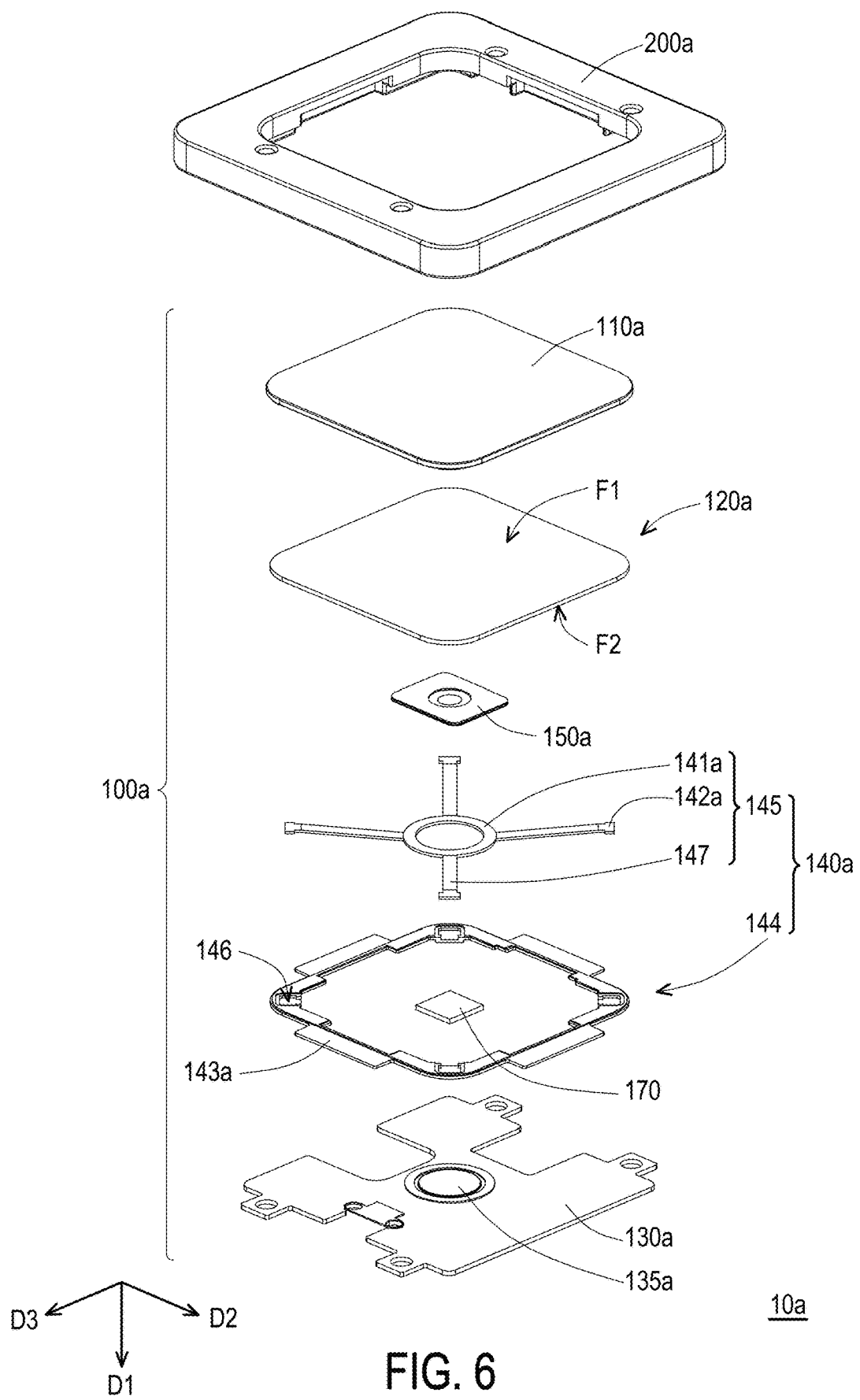
FIG. 6 is an exploded schematic view of the touch device of FIG. 5.

FIG. 6 is an exploded schematic view of the touch device of FIG. 5. Referring to FIG. 6, the input device 10a in this embodiment includes a cover body 200a and a touch device 100a. The touch device 100a includes a panel 110a, a circuit board 120a, a bracket 130a, and a reinforcement structure 140a. The panel 110a is made of glass, for example, and may allow users to input commands by touching or pressing. The cover body 200a is, for example, a keyboard cover or bottom plate (not shown) of a laptop computer, and surrounds the panel 110a, the circuit board 120a, the bracket 130a and the reinforcement structure 140a, so as to secure the input device 10a to an electronic device. The circuit board 120a has a first surface F1 and a second surface F2 opposite to each other. The panel 110a is disposed on the first surface F1 of the circuit board 120a. The bracket 130a is disposed on the second surface F2 of the circuit board 120a through the reinforcement structure 140a. The reinforcement structure 140a is disposed on the second surface F2 of the circuit board 120a and is positioned between the circuit board 120a and the bracket 130a. The bracket 130 and the reinforcement structure 140 are, for example, metal parts; the panel 110a, the circuit board 120a, and the reinforcement structure 140a are connected to each other by gluing, for example, but their connection is not limited thereto.

In this embodiment, the touch device 100a further includes a switch 150a and an elastic body 170. The switch 150a is, for example, a metal dome, and is disposed on the second surface F2 of the circuit board 120a (e.g., at the center of the second surface F2) and positioned between the circuit board 120a and the bracket 130a. The bracket 130a further includes a protruding portion 135a, and the protruding portion 135a is aligned with the switch 150a. The elastic body 170 is provided with elasticity and is positioned between the switch 150a and the protruding portion 135a.

In this embodiment, the reinforcement structure 140a includes a first reinforcement member 144 and a second reinforcement member 145. The first reinforcement member 144 is, for example, frame-shaped and disposed on the second surface F2 of the circuit board 120a, but the shape of the first reinforcement member 144 is not limited thereto. A side portion of the first reinforcement member 144 includes a stopper 143a extending outwardly. A surface of the first reinforcement member 144 adjacent to the circuit board 120a includes a groove 146 which is, for example, disposed at each corner of the first reinforcement member 144. The second reinforcement member 145 includes a fixing end portion 141a and a moving end portion 142a. The fixing end portion 141a is, for example, annular and connected to the bracket 130a. The moving end portion 142a is slidably disposed in the groove 146 of the first reinforcement member 144. The moving end portion 142a and the fixing end portion 141a are connected through a plurality of elastic arms 147. The touch device 100a supports the panel 110a and the circuit board 120a through the elastic arms 147.

Figure 7:
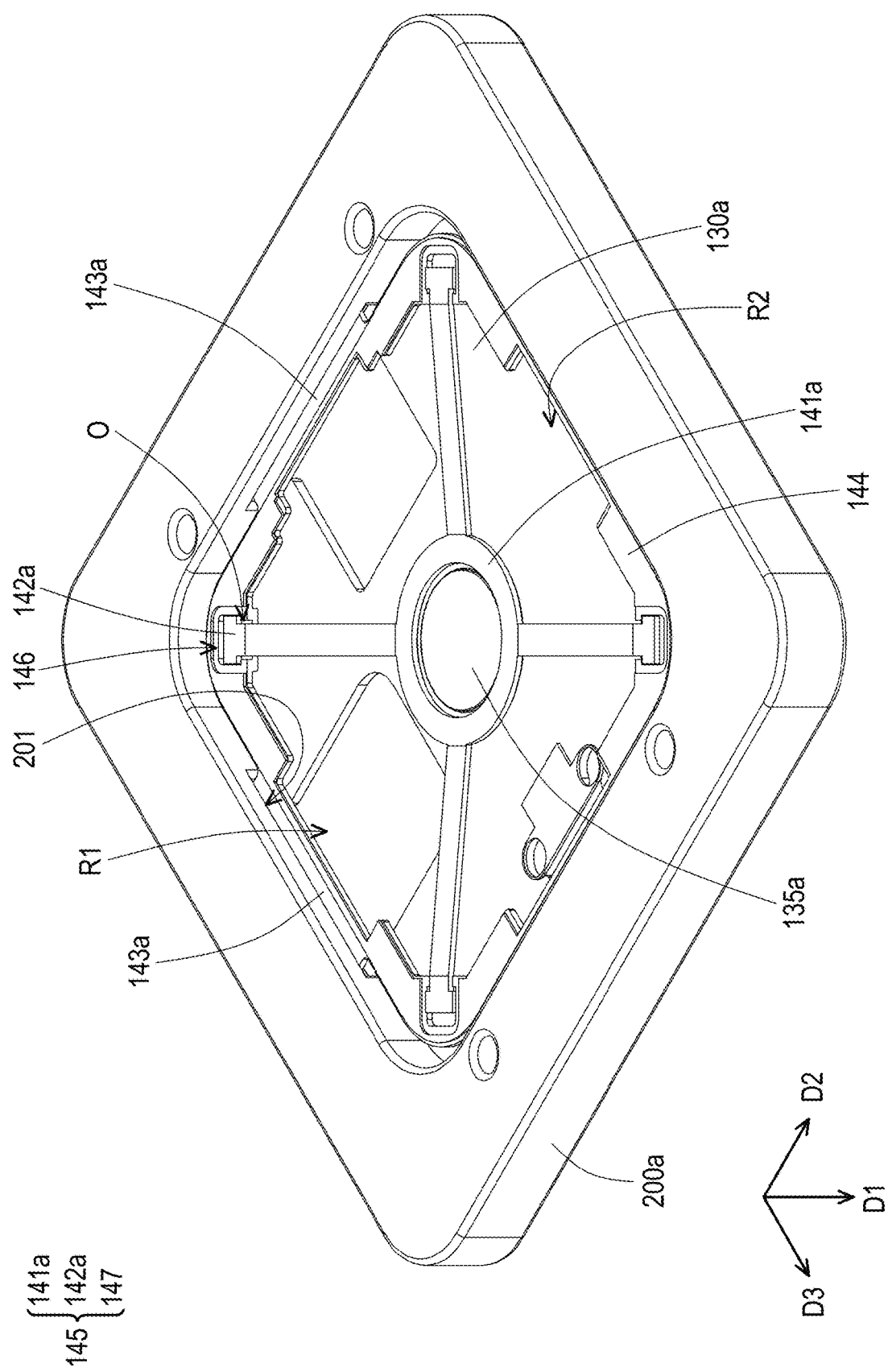
FIG. 7 is another schematic view of the touch device of FIG. 5.

FIG. 7 is another schematic view of the touch device of FIG. 5. To clearly present the interior of the touch device 100a, the panel 110a and the circuit board 120a are hidden in FIG. 7. Referring to FIG. 7, specifically, the elastic arms 147 are disposed at intervals on the outer peripheral surface of the fixing end portion 141a and extend toward the first reinforcement member 144, so that the initial position of the moving end portion 142a is higher than the fixing end portion 141a. More specifically, the moving end portion 142a is located between the groove 146 of the first reinforcement member 144 and the circuit board 120a (FIG. 6), and the elastic arm 147 extends from the fixing end portion 141a to a side opening O of the groove 146 of the first reinforcement member 144 and is connected to the moving end portion 142a. The width of the moving end portion 142a is greater than the width of the side opening O, preventing the moving end portion 142a from being separated from the groove 146.

In this embodiment, four elastic arms 147 are shown, but the number of elastic arms 147 is not limited thereto, as long as they correspond to the number of grooves 146.

In this embodiment, the stopper 143a is disposed on two opposite sides of the first reinforcement member 144. More specifically, the stoppers 143a each are disposed in the middle of each side of the first reinforcement member 144, but the position and the number of the stoppers 143a are not limited thereto. In other embodiments, each side of the first reinforcement member 144 may be provided with a plurality of stoppers 143a. For example, each side may have two stoppers provided adjacent to the corners. In addition, the cover body 200a is provided with a stopping surface 201 adjacent to the panel 110a, and the stopping surface 201 may restrict the movement of the stoppers 143a in the first direction D1.

Figure 8:
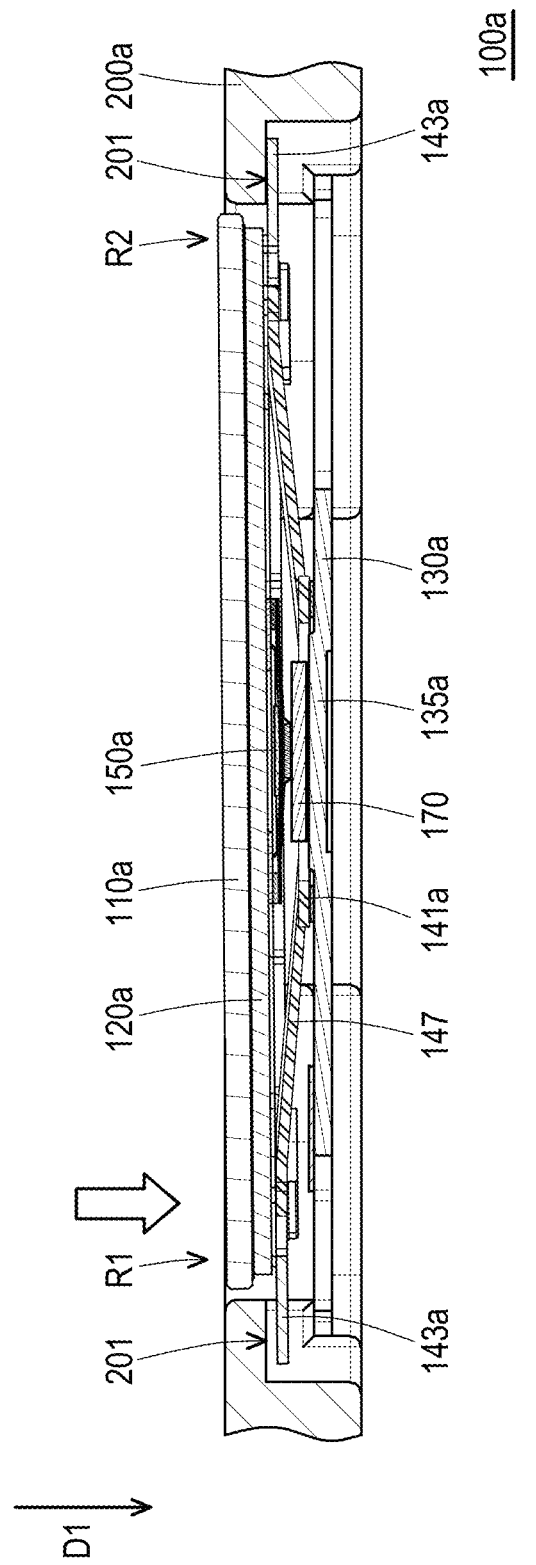
FIG. 8 is a cross-sectional view of the touch device of FIG. 5 taken along line A-A.

FIG. 8 is a cross-sectional view of the touch device of FIG. 5 taken along line A-A. In FIG. 8, a thicker arrow schematically indicates the moving direction at a first side R1 of the touch device 100a.

The operation of the touch device 100a in this embodiment will be further described below. Referring to FIG. 8, the touch device 100a has a first side R1 and a second side R2 opposite to each other. When the user presses the first side R1 on the panel 110a, the circuit board 120a and the moving end portion 142a on the first side R1 are pressed accordingly, and the moving end portion 142a stretches in the groove 146 to drive the elastic arm 147 to deform and move, so that the first side R1 of the touch device 100a may be tilted downward in the first direction D1. Meanwhile, the protruding portion 135a may trigger the switch 150a on the circuit board 120a that is sinking. Since the fixing end portion 141a serves as a fulcrum, pressing the first side R1 will drive the second side R2 to tilt upward, and the stopper 143a of the first reinforcement member 144 on the second side R2 abuts against the stopping surface 201 of the cover body 200a to generate a contact force. The contact force is transmitted to the protruding portion 135a through the elastic arm 147 to trigger the switch 150a on the circuit board 120a that is sinking, thereby achieving an input of pressing. In other embodiments, the touch device 100a may further include an elastic body 170, and the switch 150a may be triggered through the elastic body 170.

It is worth noting that when the user presses the first side R1, the first reinforcement member 144 on the second side R2 was supposed to be tilted upward due to the sinking of the first reinforcement member 144 on the first side R1, resulting in the panel 110a of the second side R2 to protrude out of the cover body 200a. However, the stopping surface 201 (FIG. 8) of the cover body 200a in this embodiment may restrict the stoppers 143a (FIG. 8) of the first reinforcement member 144 in the first direction D1, so that the movement of the circuit board 120a and the panel 110a coupled with the first reinforcement member 144 on the second side R2 is restricted, and the panel 110a only slightly moves upward above the cover body 200a, thereby effectively preventing upward tilting of the panel 110a derogating the aesthetical appearance of the device.

On the other hand, if the user presses the center of the panel 110a, the elastic arms 147 may move in the first direction D1 at the same time, and the protruding portion 135a may still trigger the switch 150a on the sinking circuit board 120a through the elastic body 170, thereby achieving an input of pressing. In other words, by implementing the aforementioned design, the touch device 100a in this embodiment may achieve full-region pressing, so that a press at any location of the panel 110a may trigger feedback.

The touch device 100a in this embodiment realizes full-region pressing by a mechanical means through the interaction between the first reinforcement member 144 and the second reinforcement member 145, which not only requires fewer components and is easy to assemble, but also lowers manufacturing costs.

Figure 9:
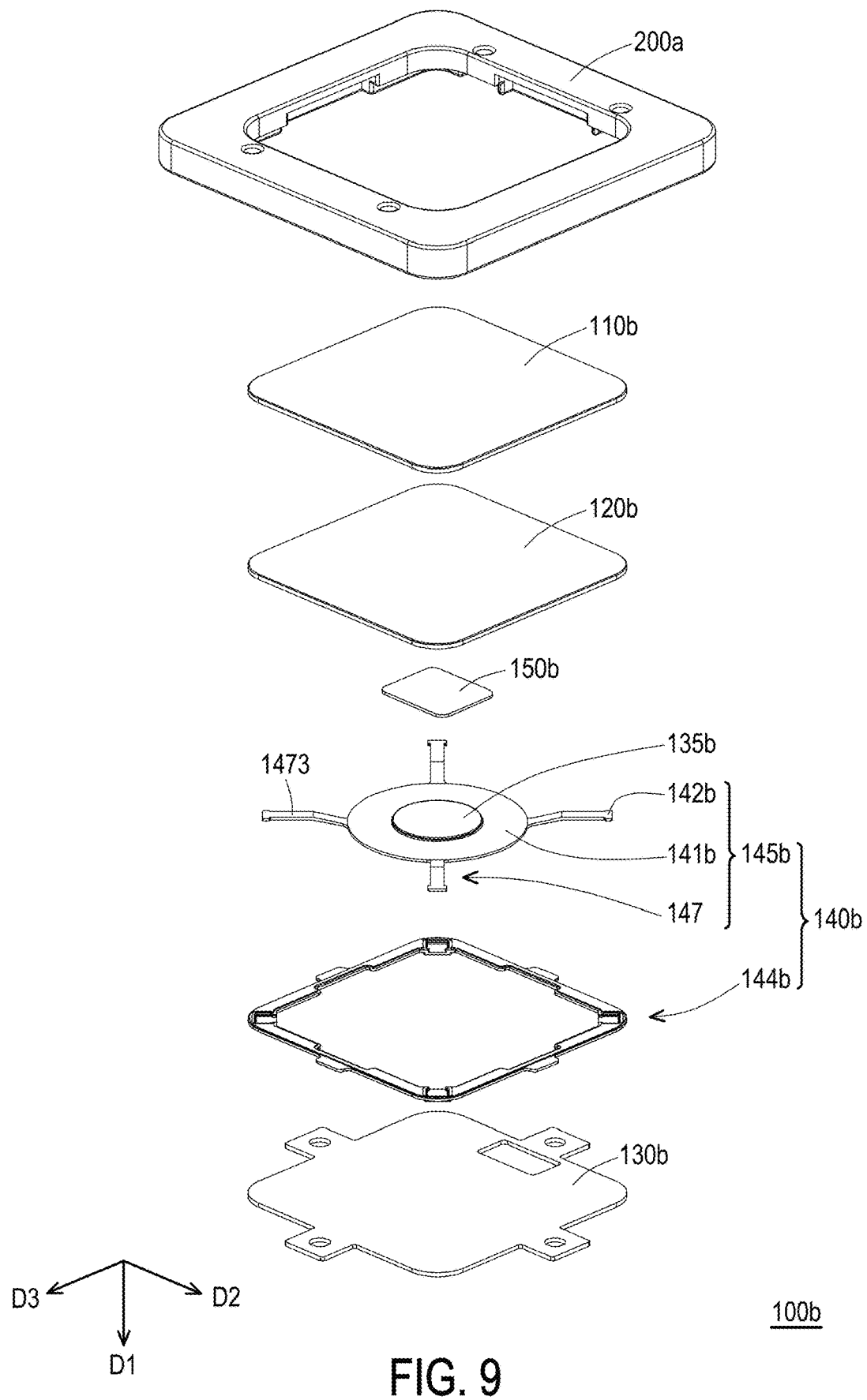
FIG. 9 is an exploded schematic view of the touch device according to another embodiment of the disclosure.

FIG. 9 is an exploded schematic view of the touch device according to another embodiment of the disclosure. The main differences between the embodiment shown in FIG. 9 and the embodiment shown in FIG. 6 are that the protruding portion 135b of the touch device 100b may be disposed on the second reinforcement member 145b instead of the bracket 130b, and the elastic arm 147 has a bending region 1473.

Specifically, in this embodiment, the fixing end portion 141b of the second reinforcement member 145b is, for example, disc-shaped, and the protruding portion 135b is disposed on the fixing end portion 141b. When the user presses the panel 110b as in the previous embodiments, the circuit board 120b may be sunk in the first direction D1, and the protruding portion 135b on the fixing end portion 141b may trigger the switch 150b disposed on the circuit board 120b, thereby achieving an input of pressing. In this embodiment, the elastic arm 147 has the bending region 1473, so the initial position of the moving end portion 142b is higher than the fixing end portion 141b in the first direction D1.

In addition, the configuration and functions of the panel 110b, the circuit board 120b, the first reinforcement member 144b and the second reinforcement member 145b of the reinforcement structure 140b, and the bracket 130b in this embodiment are the same as or similar to those of the embodiment shown in FIG. 6 and will not be described in detail herein.

Figure 10:
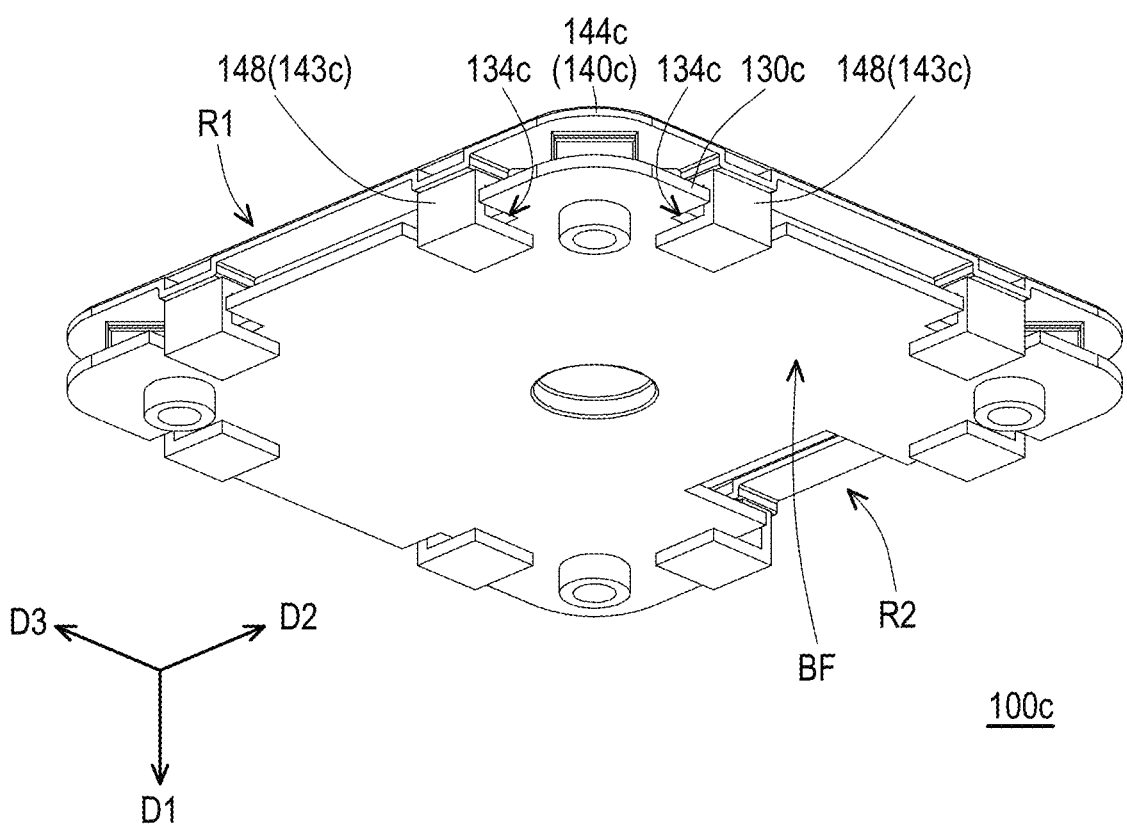
FIG. 10 is a schematic view of the touch device according to another embodiment of the disclosure.

FIG. 10 is a schematic view of the touch device according to another embodiment of the disclosure. To clearly present the interior of the device, the cover body, the panel, and the circuit board are hidden in FIG. 10. A main difference between the embodiment shown in FIG. 10 and the embodiments shown in FIG. 6 or FIG. 9 is that the stopper 143c of the touch device 100c in FIG. 10 is a snap-fit mechanism to achieves restriction.

Specifically, the stopper 143 is provided on the first reinforcement member 144c as in the previous embodiments, but extend approximately as C-shape to form an engaging portion 148. The edges of the bracket 130c are preferably provided with notches 134c. The engaging portion 148 may pass through one of the notches 134c and contact a side (i.e., the bottom surface BF) of the bracket 130c distant from the circuit board 120 to restrict the movement of the first reinforcement member 144c of the reinforcement structure 140c in the first direction D1.

Similar to the embodiment shown in FIG. 5, when the first reinforcement member 144c on the first side R1 in this embodiment is pressed in the first direction D1, the first reinforcement member 144c on the second side R2 was supposed to be tilted upward. However, since the engaging portions 148 are engaged with the bottom surface BF, limiting the movement of the first reinforcement member 144c in the first direction D1, the upward tilting of the first reinforcement member 144c is restricted, preventing derogating the aesthetical appearance of the device.

In addition, the engaging portion 148 in this embodiment is, for example, a buckle or a plunger, but the type of the engaging portion 148 is not limited thereto, as long as it restricts the movement of the first reinforcement member 144c.

In summary, in the touch device of the disclosure, the reinforcement structure includes the fixing end portion and the moving end portion opposite to each other and the stopper. The fixing end portion is connected to a bracket, and the moving end portion is movable relative to the fixing end portion. By implementing the reinforcement structure in the design, switch can be triggered and components can be securely retained without introducing additional components. The device is structurally simplified and easy to assemble, thereby lowering manufacturing costs while ensuring excellent touch experience by allowing multiple locations of the touch device accessible for receiving touch inputs.

Additionally, in another embodiment of the disclosure, full-region pressing may be realized through the mechanical interaction between the first reinforcement member and the second reinforcement member, allowing signal feedback when pressed at any location of the panel, without a use of a force-sensing plate. In this way, fewer components are required in the device, an easier assembly is facilitated, and thus manufacturing costs are reduced.

Lastly, it should be noted that each of the above embodiments is used to describe the technical solutions of the invention instead of limiting them. Although the invention has been described in detail with reference to each embodiment above, those having ordinary skill in the art should understand that the technical solution recited in each embodiment above may still be modified, or some or all of the technical features thereof may be combined or equivalently replaced. These modifications, combinations, or replacements do not make the essence of the corresponding technical solutions depart from the scope of the technical solution of each embodiment of the invention.

What is claimed is:

1. A touch device, comprising:
    a panel;
    a circuit board, having a first surface and a second surface opposite to each other, wherein the panel is disposed on the first surface of the circuit board;
    a bracket, disposed on the second surface of the circuit board; and
    a reinforcement structure, comprising a fixing end portion and a moving end portion opposite to each other and a stopper, wherein the fixing end portion is connected to the bracket, the stopper is adjacent to the moving end portion and is distant from the fixing end portion, and the stopper is adapted to move in a first direction.

2. The touch device according to claim 1, wherein the stopper protrudes from the moving end portion in a second direction, and the second direction is orthogonal to the first direction.

3. The touch device according to claim 1, wherein the bracket has an opening penetrating through the bracket, the reinforcement structure is disposed in the opening, and the fixing end portion is connected to a first inner lateral wall of the opening.

4. The touch device according to claim 3, wherein the bracket further comprises a notch, the notch is formed on a second inner lateral wall of the opening and is adapted to accommodate the stopper.

5. The touch device according to claim 4, wherein a gap is formed between the reinforcement structure and the second inner lateral wall of the opening.

6. The touch device according to claim 4, wherein a slit is provided between the first inner lateral wall and the second inner lateral wall.

7. The touch device according to claim 4, wherein the reinforcement structure and the bracket are formed into one piece.

8. The touch device according to claim 1, wherein one end of the bracket corresponding to the fixing end portion has a bending section, and the bending section is provided with a hole.

9. The touch device according to claim 1, further comprising a switch, wherein the switch is disposed on the second surface of the circuit board and is adjacent to the moving end portion, the bracket comprises a protruding portion, and the protruding portion is aligned with the switch.

10. The touch device according to claim 1, wherein the reinforcement structure comprises a first reinforcement member and a second reinforcement member, the first reinforcement member is disposed on the second surface of the circuit board, a side portion of the first reinforcement member comprises the stopper, a surface of the first reinforcement member adjacent to the circuit board comprises a groove, the second reinforcement member comprises the fixing end portion and the moving end portion, the fixing end portion is connected to the bracket, and the moving end portion is adapted to be slidably disposed in the groove of the first reinforcement member.

11. The touch device according to claim 10, wherein the moving end portion and the fixing end portion are connected through a plurality of elastic arms, and the plurality of elastic arms are disposed at intervals on an outer peripheral surface of the fixing end portion and extend toward the first reinforcement member.

12. The touch device according to claim 11, wherein each of the plurality of elastic arms has a bending region.

13. The touch device according to claim 10, wherein a width of the moving end portion is greater than a width of a side opening of the groove.

14. The touch device according to claim 10, further comprising a switch, wherein the switch is disposed between the circuit board and the bracket, the second reinforcement member or the bracket further comprises a protruding portion, and the protruding portion is aligned with the switch.

15. The touch device according to claim 14, further comprising an elastic body, wherein the elastic body is positioned between the switch and the protruding portion.

16. The touch device according to claim 10, wherein the stopper has an engaging portion, the engaging portion contacts a surface of the bracket distant from the circuit board and is adapted to restrict movement of the reinforcement structure in the first direction.

17. The touch device according to claim 16, wherein a notch is provided on an edge of the bracket, and the engaging portion passes through the notch.

18. The touch device according to claim 1, further comprising a cover body, wherein the cover body surrounds the panel, the cover body is provided with a stopping surface adjacent to the panel, and the stopping surface is adapted to restrict movement of the stopper in the first direction.

19. The touch device according to claim 1, wherein the stopper is disposed on two opposite sides of the reinforcement structure.

20. An input device, comprising the touch device according to claim 1.

* * * * *